J. N. ROBERTS.
TREE GUARD OR PROTECTOR.
APPLICATION FILED JUNE 20, 1917.
1,264,862.
Patented Apr. 30, 1918.
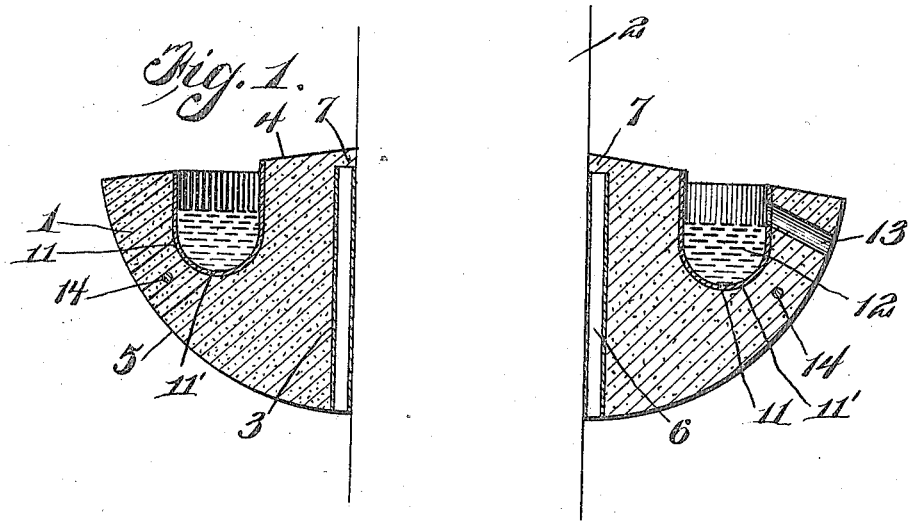
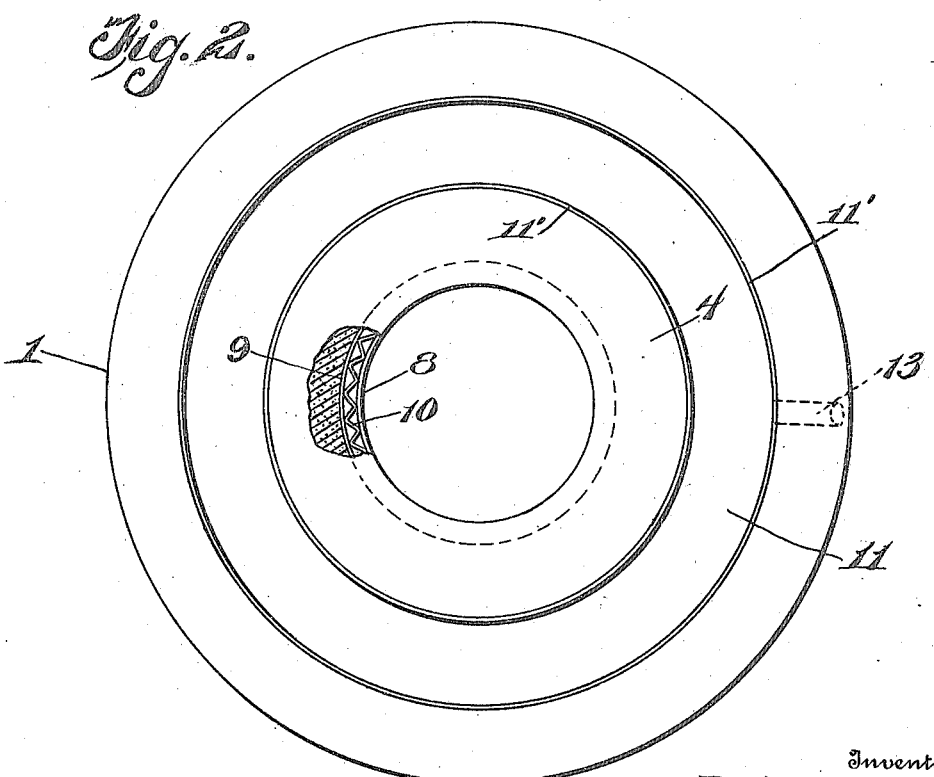

UNITED STATES PATENT OFFICE.

JOHN NEWTON ROBERTS, OF LAWRENCE, KANSAS.

TREE GUARD OR PROTECTOR.

1,264,862.	Specification of Letters Patent.	Patented Apr. 30, 1918.

Application filed June 20, 1917. Serial No. 175,940.

*To all whom it may concern:*

Be it known that I, JOHN N. ROBERTS, a citizen of the United States, residing at Lawrence, in the county of Douglas and State of Kansas, have invented certain new and useful Improvements in Tree Guards or Protectors, of which the following is a specification, reference being had therein to the accompanying drawing.

This invention relates to a tree guard or protector designed to be disposed about the trunk of a tree to form a protecting barrier to prevent moths and other climbing insects or worms from ascending the tree and destroying the foliage, as well as to effect the destruction of any insects which may reach and climb upon the barrier, and which will furthermore prevent cats and other animals from climbing the tree and destroying any birds or their nests which may be ensconced therein.

The primary object of the invention is to provide a simple, inexpensive and durable construction of protector which is adapted to be used without injury to the trees, which will allow free growth of the tree and ventilation about the bark thereof, and which may be used without mutilating or discoloring the bark.

A further object of the invention is to provide a protector of the character described which embodies means for holding an insecticide or other destroying agent, and for permitting of the free drainage off of rain water.

The invention consists of the features of construction, combination and arrangement of parts, hereinafter fully described and claimed, reference being had to the accompanying drawing, in which:—

Figure 1 is a vertical transverse section of the guard or protector applied to the trunk of a tree.

Fig. 2 is a top plan view of the same.

In carrying my invention into practice, I provide a guard or protector 1, composed of sand and cement, or some other suitable plastic composition or material, molded into the desired form. This guard is in general of annular or ring form so as to completely surround the trunk 2 of the tree to be protected, at the desired elevation. The guard is formed with a central vertical or axial opening 3 for the passage of the trunk 2, and is preferably provided with a downwardly and outwardly sloping top surface 4 to form a rain-shed, to facilitate the drainage off of rain water falling thereon. The diameter of the guard is such, relative to the diameter of the trunk 2, as to cause it to project laterally on all sides beyond the trunk to an effective extent, and in order to deter and prevent worms and other insects from climbing from the bottom of the trunk upwardly over the guard, the latter is provided with a rounded bottom surface 5 extending continuously on a curved line from the wall of the opening 3 at the bottom of the guard to the peripheral edge of the top surface 4 of the guard.

The opening 3, except at its uppermost portion, is of sufficiently greater diameter than the tree trunk 2 to receive an intervening filler 6 of a type to serve as a ventilator, cushioning medium and discoloration preventer. This filler 6 extends the full depth of the opening 3, which is closed at its upper portion by an overhanging flange 7, which snugly encircles the trunk 2, and is designed to prevent rain water and the like from falling downwardly into the opening 3, and to protect the filler 6 against the action of moisture.

The filler 6 preferably consists of an annular body or collar composed of inner, outer and intermediate plies 8, 9 and 10 of paper, the intermediate ply 10 being graduated or folded on zig zag lines, to provide ventilation cells or passages, and also to provide portions capable of expansion and contraction, whereby a cushioning layer is interposed between the guard and trunk of the tree which will yield sufficiently to allow the bark of the tree to have its natural growth, and which will also afford free ventilation about the bark of the tree. The inner ply or layer 8 furthermore serves as a protecting shield preventing all of the guard except the flange 7, from coming in direct contact with the surface of the tree, a feature of advantage in the application of the device to shade and other like ornamental trees.

The guard is provided in its upper surface with a gutter or channel 11, extending around the same for the purpose of holding a body 12 of a liquid insecticide or destroyer of any suitable kind, such as a poisonous fluid. This gutter is designed to prevent any insects which may possibly manage to crawl up to the top surface of the guard from traveling inwardly to the portion of the trunk above the guard, the insects passing over the rim of the guard in an attempt to reach the trunk falling into the gutter or channel and being destroyed by the fluid contents thereof. The fluid charge 12 is maintained in such a quantity that its upper surface lies just below the inner end of an outflow or drain passage 13, through which any rain water which falls into the gutter or channel may discharge. A reinforcing rod or wire 14 may extend around and be embedded in the guard for the purpose of strengthening and reinforcing the same, to adapt the guard to maintain its integrity under all conditions of service.

In practice the guard is molded about the tree by the use of a suitable mold, and, if its continuous use is not desired, it may be used only during the season when the trunk is liable to be attacked and removed by simply breaking it into pieces after its use is no longer desired. The advantages arising from my improved construction are, that a simple, cheap and, to some extent, ornamental form of guard is provided, which may be easily and conveniently formed and applied for use and readily removed without injury to the tree, which will protect the tree in an effective manner from insects and also prevent passage of animals in the foliage, and will furthermore allow natural growth of the bark of the tree and prevent discoloration thereof.

If desired, the channel or gutter 11 may be provided with a lining 11' of painted canvas or other suitable material to hold and prevent the liquid contents from running out and escaping, in the event that the molded guard should crack or check sufficiently to allow it to do so if no lining were employed.

Having thus fully described my invention, I claim:

1. An insect guard comprising a body arranged to surround a tree and having a central opening through which the tree extends in spaced relation, a flange overhanging the top of said opening and engaging the tree, and a cellular cushioning structure disposed in said opening beneath said flange.

2. An insect guard for trees comprising a body arranged to surround the tree and having a fluid receiving gutter therein and opening through its upper face, and a protective lining for said gutter composed of a facing of moisture proof fabric.

3. An insect guard for trees comprising a body arranged to surround the tree, and having a central opening for the passage of the tree and a flange overhanging the top of the opening, and a cushioning body of a cellular structure disposed within said opening and beneath said flange and between the wall of the opening and the tree.

In testimony whereof I hereunto affix my signature in the presence of two witnesses.

JOHN NEWTON ROBERTS.

Witnesses:
J. E. HARRIS,
A. GIFFORD.